of the motor. The power circuit is broken when the reaction torque drops below a predetermined value indicating that at least one of the batteries has discharged beyond a certain point to prevent reverse charging of the discharged battery.

United States Patent
Mabuchi et al.

[11] 3,937,911
[45] Feb. 10, 1976

[54] CIRCUIT BREAKER FOR SMALL SIZE MOTORS

[75] Inventors: Kenichi Mabuchi; Kogiro Komatsu, both of Tokyo, Japan

[73] Assignee: Mabuchi Motor Co. Ltd., Tokyo, Japan

[22] Filed: Apr. 29, 1974

[21] Appl. No.: 464,939

[52] U.S. Cl......... 200/61.39; 46/243 M; 200/153 N; 310/116
[51] Int. Cl.² ................. H01H 3/16; A63H 33/26; H02K 23/60
[58] Field of Search ......... 200/61.39, 153 N, 153 T, 200/159 R, 61.46; 46/243 M, 243 AV, 243 MV, 243 LV, 247; 310/115, 116, 118, 120; 318/139, 466, 474, 489; 340/271

[56] References Cited
UNITED STATES PATENTS

| 1,587,645 | 6/1926 | Hicquet | 310/116 X |
| 2,677,021 | 4/1954 | Baumgardner | 200/61.39 X |
| 2,754,383 | 7/1956 | Green | 200/61.39 |
| 2,814,698 | 11/1957 | Miller, Sr. | 200/159 R |
| 2,923,092 | 2/1960 | Reiser | 310/116 X |
| 3,447,259 | 6/1969 | Cagen | 46/243 MV |
| 3,807,087 | 4/1974 | Staats et al. | 200/153 T X |

FOREIGN PATENTS OR APPLICATIONS

| 878,086 | 9/1961 | United Kingdom | 310/116 |

*Primary Examiner*—James R. Scott

[57] ABSTRACT

An automatic circuit breaker senses the remaining charge in series connected batteries driving a motor whose rotor shaft bearing and stator are rotatably supported by a fixed member, sensing the reaction torque of the motor. The power circuit is broken when the reaction torque drops below a predetermined value indicating that at least one of the batteries has discharged beyond a certain point to prevent reverse charging of the discharged battery.

4 Claims, 7 Drawing Figures

CIRCUIT BREAKER FOR SMALL SIZE MOTORS

BACKGROUND OF THE INVENTION

1. Field of the invention

This invention relates generally to an automatic circuit breaker for a small-sized motor, and more particularly to an automatic circuit breaker for a small-sized motor which is designed to open the motor power circuit to prevent reverse battery charging caused by unequal discharging of two or more batteries used in series connection as a power source for the motor. This invention can be applied to model planes, model ships and model automobiles to prevent reverse charging which tends to occur especially when rapidly rechargable Ni-Cd batteries are used as a power source.

2. Description of the prior art

A rapidly rechargeable Ni-Cd battery, whose discharge current is extremely high because of its low internal resistance, has recently been developed and is now widely being used in various battery-operated electric appliances.

When more than two batteries of this type, though not limited to Ni-Cd batteries, are used in series connection, the service life of the batteries tends to be substantially reduced by the so-called reverse charging in which one of the batteries is completely discharged earlier than the other batteries, thereby imposing a load on the other batteries. Thus, it is desired to open the power circuit, when the remaining charge in the batteries drops to a certain level to prevent complete discharge of the batteries.

Such consideration is especially important in a model plane or model ship powered by batteries since such a model often travels out of the reach of the operator.

Conventional automatic circuit breakers for this purpose employ, for instance, a method to open the power circuit by actuating a relay when the voltage drops, a method using a semiconductor and a relay, or a method to break the power circuit, in the case of a model plane, by actuating a switch by means of part of the propeller shaft which is rotated by wind force as the motor speed drops due to reduced battery voltage. All of these methods have achieved satisfactory results in specific applications. However, this invention is intended to achieve these results by providing a novel automatic circuit breaker, in place of the aforementioned conventional methods, to prevent reverse charging by sensing the reaction torque at a bearing of a motor powered by batteries.

SUMMARY OF THE INVENTION

It is an object of the present invention to provide a circuit breaker which is designed to break a circuit by sensing the shaft speed of a motor powered by batteries by sensing the reaction torque at the motor bearing.

A further object of the present invention is to break the power circuit prior to the occurrence of reverse battery charging when two or more rapidly-rechargable Ni-Cd batteries are used in series connection.

It is a further object of the present invention to apply a circuit breaker of this invention to a model plane.

It is a still further object of the present invention to apply a circuit breaker of this invention to a model ship.

DETAILED DESCRIPTION OF THE INVENTION

Figure 1:
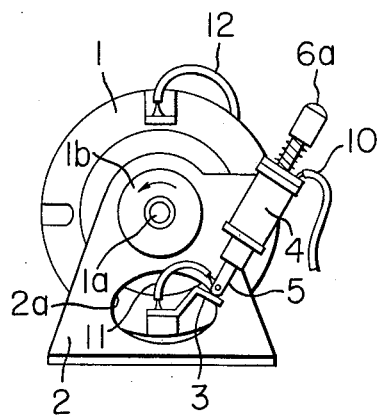
FIGS. 1 and 2 are front views of a motor incorporating an embodiment of a circuit breaker according to the invention illustrating the effects of the motor reaction torque.
Figure 2:
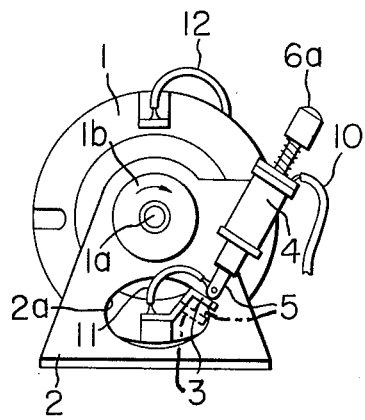

Referring first to FIGS. 1 and 2, the stator of a motor 1 is supported by means of a rotor shaft bearing 1b fixed thereto which in turn rotatably supports a rotor shaft 1a of the motor 1. The bearing 1b and thereby the stator of the motor 1 are rotatably supported by a fixed bracket 2. A stopper 3 is fixed to the stator of the motor 1 and extends through an opening 2a formed in the bracket 2. A casing 4 of a circuit breaker (no numeral) embodying the invention is fixed to the bracket 2 and a movable contact rod 5 protruding therefrom engages at its end with the stopper 3. The circuit breaker also comprises a knob 6a, which will be described in detail below. A lead 10 connects the circuit breaker to a positive terminal of series connected batteries (not shown), a lead 11 connects the circuit breaker to one end of the motor stator coil (not shown) and a lead 12 connects the other end of the motor stator coil to a negative terminal of the batteries.

Figure 3:
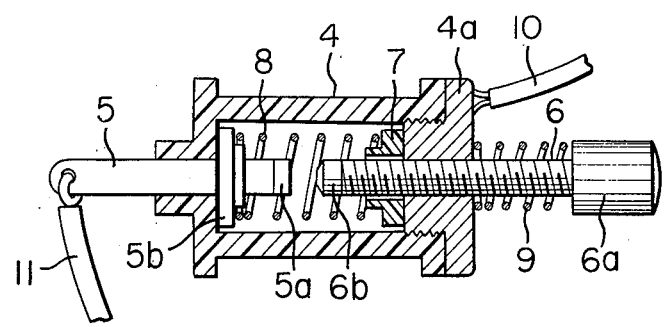
FIGS. 3 and 4 are longitudinal sectional views of the circuit breaker shown in FIGS. 1 and 2 illustrating the operation thereof.
Figure 4:
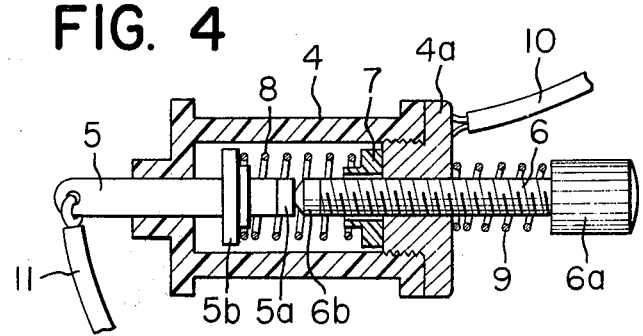

Referring now to FIGS. 3 and 4, the casing 4 is made of an insulating material such as plastic and has a conductive cap 4a threaded thereon. The cap 4a may be of copper, brass or any other conductive material, and the lead 10 is electrically connected to the cap 4a. The movable contact rod 5 is slidable through an opening formed through the left end (as shown) of the casing 4 and is electrically connected to the lead 11. An adjustable fixed contact rod 6 has the knob 6a fixed thereto and is threaded through an opening formed in the cap 4a. A compression spring 9 prevents undesired rotation of the rod 6. The movable contact rod 5 is urged leftward as shown in FIG. 3 by means of a compression spring 8 positioned between spring seat 5b and spring seat 7 and so that contact points 5a and 6b of the rods 5 and 6 respectively are moved out of engagement with each other.

The rods 5 and 6 are made of electrically conductive material so that when the contact points 5a and 6b engage as shown in FIG. 4, an electrical circuit will be completed through the batteries, the circuit breaker and the motor 1.

In operation, when the charge remaining in the batteries is above a predetermined value, the motor speed will be above a predetermined value and the stator of the motor 1 will be rotated counterclockwise as shown in FIG. 1 by a predetermined value due to the motor reaction torque. The stopper 3 will engage with the movable contact rod 5 and move the same into engagement with the fixed contact rod 6 as shown in FIG. 4 so that an electrical circuit will be established between the batteries and the motor 1 through the circuit breaker. When the batteries have discharged beyond the predetermined value and the motor speed and reaction torque similarly decrease, the stator of the motor 1 will be rotated clockwise to approximately the position shown in FIG. 2 by the spring 8 through the spring seat 5b and movable contact rod 5 so that the rods 5 and 6 will disengage as shown in FIG. 3. In this way, the circuit is broken between the batteries and the motor 1 by the circuit breaker so that reverse charging of the batteries is prevented. It should be noted that the phantom outline position of the stopper 3 shown in FIG. 2 is schematic and is for purposes of illustration and explanation only. As mentioned hereinabove, the stopper 3 is moved by the rod 5 and the biasing thereof by the spring 8 so that electrical contact is broken between the rods 5 and 6 when the stator of the motor 1 is rotated clockwise.

Figure 5:
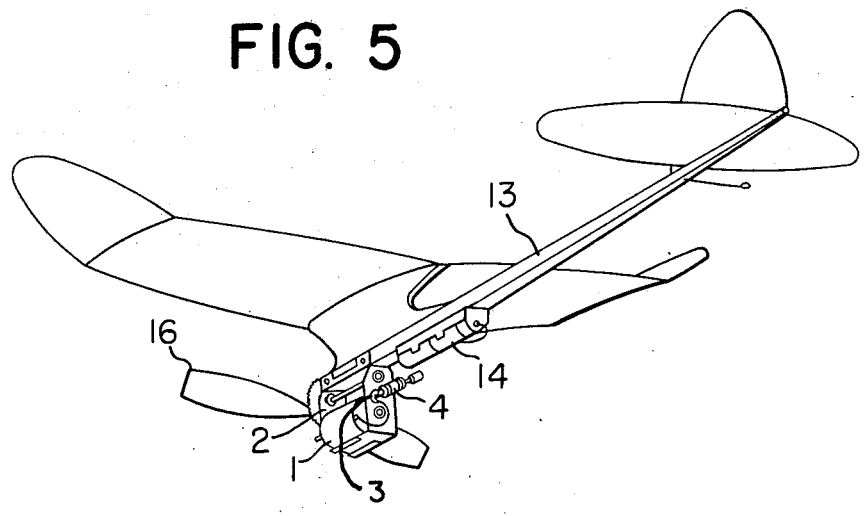
FIG. 5 is a perspective cut away view of a model airplane incorporating a motor equipped with a circuit breaker embodying the invention.

FIG. 5 illustrates the invention applied to a model airplane having a body 13. Series connected batteries 14 are carried by the plane body 13 and are connected to the circuit breaker and motor 1 as described hereinabove. The bracket 2 rotatably supports the motor 1, and the casing 4 of the circuit breaker is fixed to the bracket 2.

Figure 6:
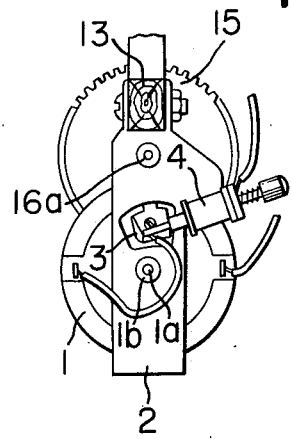
FIG. 6 is a rear view of the motor and circuit breaker shown in FIG. 5.

Referring also to FIG. 6, the bracket 2 also rotatably supports a propeller shaft 16a carrying a propeller 16. The propeller shaft 16a is drivably connected to the motor shaft 1a by means of a reduction gear set 15. The operation is the same as described hereinabove.

Figure 7:
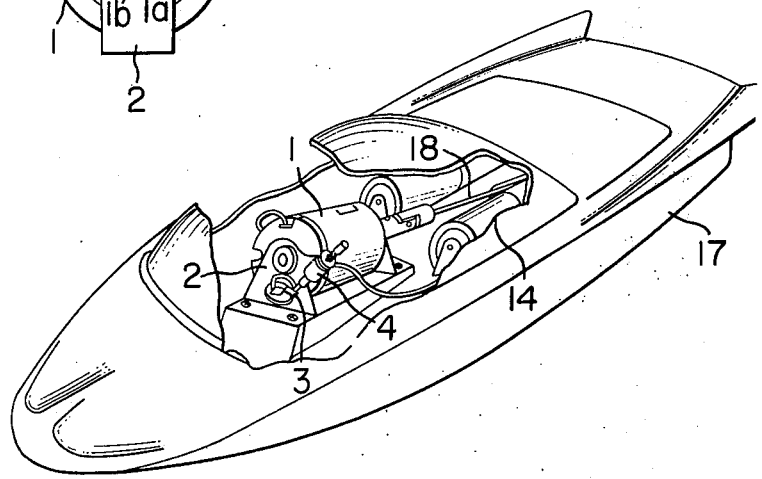
FIG. 7 is a perspective view, partially cut away, of a model ship incorporating a motor equipped with a circuit breaker embodying the invention.

FIG. 7 illustrates the invention as applied to a model ship having a hull 17. In this case, the bracket 2 is fixed to the hull 17 and a propeller shaft 18 is fixed to the motor shaft to be rotatably driven therewith. The operation is the same as described hereinabove.

Referring back to FIGS. 3 and 4, means are provided for adjusting the predetermined value of the remaining battery charge below which the circuit breaker will open and these are in the form of the adjustable fixed contact rod 6, which may be threaded by means of the knob 6a to protrude to a greater or lesser degree from the casing 4. If the rod 6 is threaded deeper into the casing 4, the circuit breaker will open at a lower value of the remaining battery charge, and vice versa.

What is claimed is:

1. A circuit breaker for a battery powered motor, in which the motor, the rotor shaft bearing and the affixed stator are rotatably supported by a fixed member, the circuit breaker being electrically connected between the motor and the battery, the circuit breaker comprising:
   a first electrical contact adjustably fixed to the fixed member;
   a second electrical contact movable into engagement with said first contact in response to rotation of the stator in a first direction;
   biasing means urging the second contact to disengage from the first contact and urging the bearing in a second direction opposite to said first direction;
   a spring acting on said second contact to urge the disengagement of said first and second contacts from each other; and
   a stopper engaged with said second contact and carried by the stator and urged thereby into engagement with said first contact by the rotation of the bearing in said first direction;
   whereby the stator is rotated in the first direction by motor reaction torque, and the second contact engages with the first contact to connect the motor to the battery when the reaction torque is above a predetermined value, the charge remaining in the battery being also above a predetermined value.

2. A circuit breaker for a battery powered motor having rotor shaft bearing and stator rotatably supported by a fixed member, said breaker being electrically connected between the motor and the battery and comprising:
   an electrically insulating casing attached to said fixed member;
   an electrically conductive cap closing one end of said casing;
   a first electrical contact connected to said fixed member and adjustably extending into said casing through said cap in ohmic contact therewith;
   a second electrical contact movably engaging said first contact in response to the rotation of the stator in a first direction, said second contact slidably extending into said casing through the other end thereof opposed to said cap end;
   a spring seat fixed to said second contact and positioned inside said casing;
   biasing means to urge said second contact into disengagement from said first contact and to urge the bearing in a second direction opposite to said first direction;
   a spring engaging said spring seat of said second contact to urge the disengagement of said first and second contacts from each other;
   a stopper engaged with said second contact and carried by the stator and urged thereby into engagement with said first contact by the rotation of the bearing in said first direction;
   said second contact and said cap being arranged for circuit connection with the motor and with the battery.

3. A circuit breaker according to claim 1, in which the fixed member is a structural member of a model airplane.

4. A circuit breaker according to claim 1, in which the fixed member is a structural member of a model ship.

* * * * *